(12) United States Patent
Zhang et al.

(10) Patent No.: US 10,109,886 B2
(45) Date of Patent: Oct. 23, 2018

(54) LITHIUM-SULFUR BATTERIES

(71) Applicant: UChicago Argonne, LLC, Chicago, IL (US)

(72) Inventors: Zhengcheng Zhang, Naperville, IL (US); Wei Weng, Woodridge, IL (US); Nasim Azimi, Bolingbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 15/302,711

(22) PCT Filed: Apr. 15, 2014

(86) PCT No.: PCT/US2014/034238
§ 371 (c)(1),
(2) Date: Oct. 7, 2016

(87) PCT Pub. No.: WO2015/160334
PCT Pub. Date: Oct. 22, 2015

(65) Prior Publication Data
US 2017/0033406 A1    Feb. 2, 2017

(51) Int. Cl.
*H01M 10/0569* (2010.01)
*H01M 10/0525* (2010.01)
(Continued)

(52) U.S. Cl.
CPC ......... *H01M 10/0569* (2013.01); *H01M 4/38* (2013.01); *H01M 4/663* (2013.01);
(Continued)

(58) Field of Classification Search
CPC ........ H01M 4/38; H01M 4/663; H01M 4/667; H01M 4/668; H01M 2004/028;
(Continued)

(56) References Cited

U.S. PATENT DOCUMENTS 6,194,099 B1    2/2001    Gernov et al.
6,566,006 B1    5/2003    Cheng et al.
(Continued)

FOREIGN PATENT DOCUMENTS

| WO | WO-99/33132 A1 | 7/1999 |
| WO | WO-01/35483 A1 | 5/2001 |
| WO | WO-2013/033579 A1 | 3/2013 |

OTHER PUBLICATIONS

Aihara, Y. et al., "Ion Transport Properties of Six Lithium Salts Dissolved in g-Butyrolactone Studied by Self-Diffusion and Ionic Conductivity Measurements", J. Electrochem. Soc., 2004, vol. 151(1), pp. A119-A122.
(Continued)

*Primary Examiner* — Brittany L Raymond
(74) *Attorney, Agent, or Firm* — Foley & Lardner LLP

(57) ABSTRACT

A lithium-sulfur electrochemical cell includes a cathode including elemental sulfur; an anode including elemental lithium; and an electrolyte including a salt and a non-polar fluorinated ether solvent. Alternatively, a lithium-sulfur electrochemical cell may include an anode; an electrolyte; and a cathode including a polytetrafluoroethylene-coated carbon paper and sulfur.

13 Claims, 16 Drawing Sheets

(51) Int. Cl.
  H01M 4/38     (2006.01)
  H01M 4/66     (2006.01)
  H01M 10/052   (2010.01)
  H01M 10/0568  (2010.01)
  H01M 4/02     (2006.01)
(52) U.S. Cl.
  CPC .......... *H01M 4/667* (2013.01); *H01M 4/668* (2013.01); *H01M 10/052* (2013.01); *H01M 10/0525* (2013.01); *H01M 10/0568* (2013.01); *H01M 2004/028* (2013.01); *H01M 2300/0034* (2013.01); *H01M 2300/0037* (2013.01)
(58) Field of Classification Search
  CPC .......... H01M 10/052; H01M 10/0568; H01M 10/0569; H01M 10/0525; H01M 2300/0034; H01M 2300/0037
  See application file for complete search history.

(56) References Cited

U.S. PATENT DOCUMENTS

| | | | |
|---|---|---|---|
| 7,147,968 B2 | 12/2006 | Han et al. | |
| 2004/0043291 A1 | 3/2004 | Kim et al. | |
| 2011/0045360 A1* | 2/2011 | Deguchi | H01M 4/0435 429/341 |
| 2012/0207994 A1 | 8/2012 | Wang et al. | |
| 2012/0214043 A1* | 8/2012 | Olschimke | H01M 4/381 429/144 |
| 2013/0122334 A1* | 5/2013 | Visco | H01M 4/38 429/72 |
| 2013/0224550 A1 | 8/2013 | Bugga et al. | |
| 2013/0244097 A1 | 9/2013 | Leitner et al. | |
| 2014/0023936 A1* | 1/2014 | Belharouak | H01M 4/38 429/335 |

OTHER PUBLICATIONS

Aurbach D. et al., "On the Surface Chemical Aspects of Very High Energy Density, Rechargeable Li-Sulfur Batteries", Journal of the Electrochemical Society, vol. 156, No. 8, 2009, pp. A694-A702.
Azimi, N. et al., "Improved performance of lithium-sulfur battery with fluorinated electrolyte," Electrochemistry Communications 37 (2013) 96-99.
Bruce P. et al., "Lithium-air and lithium-sulfur batteries", Materials Research Society, vol. 36, 2011, pp. 506-512.
Chang, D. et al., "Binary electrolyte based on tetra(ethylene glycol) dimethyl ether and 1,3-dioxolane for lithium-sulfur battery", J. Power Sources, 2002, vol. 112, pp. 452-460.
Chung, K. et al., "Lithium phosphorous oxynitride as a passive layer for anodes in lithium secondary batteries", J. Electroanal. Chem., 2004, vol. 566, pp. 263-267.
Dokko, K. et al., "Solvate Ionic Liquid Electrolyte for Li—S Batteries", J. Electrochem. Soc., 2013, vol. 160(8), pp. A1304-A1310.
Guo J. et al., "Sulfur-Impregnated Disordered Carbon Nanotubes Cathode for Lithium-Sulfur Batteries", NanoLetters, vol. 11, 2011, pp. 4288-4294.
Hassoun, J. et al., "Moving to a Solid-State Configuration: A Valid Approach to Making Lithium-Sulfur Batteries Viable for Practical Applications", Adv. Mater., 2010, vol. 22, pp. 5198-5201.

International Search Report & Written Opinion in International Application No. PCT/US2014/034238, dated Aug. 22, 2014 (9 pages).
Jeong, S. et al., "Carbon coated lithium sulfide particles for lithium battery cathodes", J. Power Sources, 2013, vol. 235, pp. 220-225.
Ji, X. et al., "Advances in Li—S batteries", J. Mater. Chem., 2010, vol. 20, pp. 9821-9826.
Kavan, L. "Electrochemical Carbon", Chemical Reviews, vol. 97, No. 8, 1997, pp. 3061-3082.
Lee, Y. et al., "Electrochemical performance of lithium/sulfur batteries with protected Li anodes", J. Power Sources, 2003, vol. 119-121, pp. 964-972.
Liang C., "Additives and Cathode Materials for High-Energy Lithium Sulfur Batteries", Vehicle Technologies Program Annual Merit Review and Peer Evaluation Meeting, May 2013, 21 slides.
Lin, Z. et al., "Phosphorous Pentasulfide as a Novel Additive for High-Performance Lithium-Sulfur Batteries", Adv. Funct. Mater., 2013, vol. 23, pp. 1064-1069.
Mikhaylik et al., "Polysulfie Shuttle Study in the Li/S Battery System", Journal of the Electrochemical Society, vol. 151, No. 11, 2004, pp. A1969-A1976.
Mikhaylik, Y. et al., High Energy Rechargeable Li—S Cells for EV Application. Status, Remaining Problems and Solutions, ESC Trans., 2010, vol. 25(35), pp. 23-34.
Nagao, M. et al., "Electrochemical Performance of All-Solid-State Li/S Batteries with Sulfur-Based Composite Electrodes Prepared by Mechanical Milling at High Temperature", Energy Technol., 2013, vol. 1, pp. 186-192.
Nelson, J. et al., "In Operando X-ray Diffraction and Transmission X-ray Microscopy of Lithium Sulfur Batteries", Journal of the American Chemical Society, vol. 134, 2012, pp. 6337-6343.
Ryu, H. et al., "Discharge behavior of lithium/sulfur cell with TEGDME based electrolyte at low temperature", J. Power Sources, 2006, vol. 163, pp. 201-206.
Shin, J. et al., "N-Methyl-(n-butyl)pyrrolidinium bis(trifluoromethanesulfonyl)imide-LiTFSI-poly(ethylene glycol) dimethyl ether mixture as a Li/S cell electrolyte", J. Power Sources, 2008, vol. 177, pp. 537-545.
Wang J. et al., "Sulfur-mesoporous carbon composites in conjunction with a novel ionic liquid electrolyte for lithium rechargeable batteries", Carbon, vol. 46, 2008, pp. 229-235.
Weng, W. et al., "Ultrasound Assisted Design of Sulfur/Carbon Cathodes with Partially Fluorinated Ether Electrolytes for Highly Efficient Li/S Batteries", Advanced Materials, vol. 25, 2013, pp. 1608-1615.
Yang Y. et al., "High-Capacity Micrometer-Sized Li2S Particles as Cathode Materials for Advanced Rechargeable Lithium-Ion Batteries", Journal of the American Chemical Society, vol. 134, 2012, pp. 15387-15394.
Yuan, L.X. et al., "Improved dischargeability and reversibility of sulfur cathode in a novel ionic liquid electrolyte", Electrochem. Commun., 2006, vol. 8, pp. 610-614.
Zhang et al., "Enhancement of long stability of sulfur cathode by encapsulating sulfur into micropores of carbon spheres", Energy & Environmental Science, vol. 3, 2010, pp. 1531-1537.
Zhang, S., "Liquid electrolyte lithium/sulfur battery: Fundamental chemistry, problems, and solutions", Journal of Power Sources, vol. 231, 2013, pp. 153-162.
Zu, C. et al., "Improved lithium-sulfur cells with a treated carbon paper interlayer", Phys. Chem. Chem. Phys., 2013, vol. 15, pp. 2291-2297.
Extended European Search Report in EP Application No. 14889219.3, dated Sep. 25, 2017 (7 pages).

* cited by examiner

LITHIUM-SULFUR BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

CROSS-REFERENCE TO RELATED APPLICATION

The present application is a U.S. national phase application under 35 U.S.C. § 371 of International Application No. PCT/US2014/034238, filed on Apr. 15, 2014, which is incorporated herein by reference in its entirety.

FIELD

The present technology is generally related to lithium-sulfur batteries. In particular, the technology is related to lithium-sulfur batteries with fluorinated electrolyte materials and/or sulfur electrode with fluorinated layer on the surface.

BACKGROUND

The lithium-sulfur batteries provide for a promising energy storage system due to their superior specific capacity (1675 mAh per gram of sulfur). However, such batteries pose several technological challenges. In particular, rapid capacity fade and low coulombic efficiency (CE) plague the batteries. These challenges are believed to be associated with the loss of the sulfur active material during repeated charging and discharging, and through dissolution of the lithium polysulfides from the sulfur cathode into the electrolyte. Such polysulfides may then undergo side reactions with the electrolyte solvents and the lithium anode.

Lithium-sulfur cells operate as lithium ions migrate from the lithium metal anode surface during discharge, and to the anode during charging. This in contrast to conventional lithium-ion cells where the ions are intercalated in the anode and cathode, resulting in much higher lithium storage density. With a sulfur cathode (a composite with a conductive material to account for sulfur, itself, being an insulator), during discharge the sulfur is reduced to a variety of polysulfides and eventually to lithium sulfide according to:

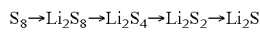

$$S_8 \rightarrow Li_2S_8 \rightarrow Li_2S_4 \rightarrow Li_2S_2 \rightarrow Li_2S$$

Major technical roadblocks for lithium-sulfur batteries have been that polysulfides that dissolve into the electrolyte and diffuse to the anode where they cause severe shuttling effects, the lithium sulfides are insoluble and plate onto the cathode blocking active material underneath, and severe self-discharge.

One previous approach to reducing these effects was to introduce porous carbon materials into the cathode to trap the lithium polysulfides within the cathode during cycling by the strong adsorption property of carbon. See e.g. Ji et al. *J. Mater. Chem.* 20 (2010) 9821; Jeong et al. *J. Power Sources* 235 (2013) 220; and Zu et al. *Phys. Chem. Chem. Phys.* 15 (2013) 2291. Another approach was to form a protective layer on the lithium anode surface to mitigate the redox reaction of the dissolved polysulfides and lithium metal. See e.g. Chung et al. *J. Electroanal. Chem.* 566 (2004) 263; Lee et al. *J. Power Sources* 119-121(2003) 964; and Mikhaylik et al. *ESC Trans.* 25 (2010) 23. Yet another approach was the development of new solid state electrolyte, (See Nagao et al *Energy Technol.* 1 (2013) 186-192, and Hassoun et al., B. Scrosati, *Adv. Mater.* 22 (2010) 5198), electrolytes consisting of ionic liquid, (See e.g. Yuan et al. *Electrochem. Commun.* 8 (2006) 610.; Shin et al. *J. Power Sources* 177 (2008) 537; Dokko et al. *Electrochem. Soc.* 160 (2013) A1304), tetra(ethylene glycol) dimethyl ether (Ryu et al. *J. Power Sources* 163 (2006) 201, and Chang et al. *J. Power Sources* 112 (2002) 452), as organic solvents for the electrolyte, lithium salt electrolytes, (See e.g. Aihara et al. *J. Electrochem. Soc.* 151 (2004) A119), and functional electrolyte additives (See e.g. Lin et al. *Adv. Funct. Mater.* 23 (2013) 1064) to prevent the dissolution of the polysulfides into the organic electrolyte and thereby avoid the redox shuttling effect. These approaches can improve the Li—S performance to some extent but still cannot solve the above-mentioned problems.

SUMMARY

In one aspect, a lithium-sulfur electrochemical cell is provided, the cell including a cathode including elemental sulfur; an anode including elemental lithium; and an electrolyte including a salt and a non-polar fluorinated ether solvent. In some embodiments, the non-polar fluorinated ether solvent is of formula R—O—R$^1$, wherein R is a partially fluorinated or perfluorinated alkyl group, and R$^1$ is a partially fluorinated or perfluorinated alkyl group. R and R$^1$ may also be alkyl groups that are substituted as ethers, or in other words, R and R$^1$ may optionally be interrupted by additional oxygen atoms. Alternatively, R and R$^1$ may be linked together to form a cyclic fluorinated ether. In any of the above embodiments, the electrolyte may further include a non-fluorinated co-solvent. In any of the above embodiments, the cathode may include the sulfur embedded in a polytetrafluoroethylene-coated carbon paper.

In another aspect, a lithium-sulfur electrochemical cell includes an anode; an electrolyte; and a cathode including a polytetrafluoroethylene-coated carbon paper and sulfur. In such aspects, the anode may be a lithium metal anode.

DETAILED DESCRIPTION

Figure 1A:
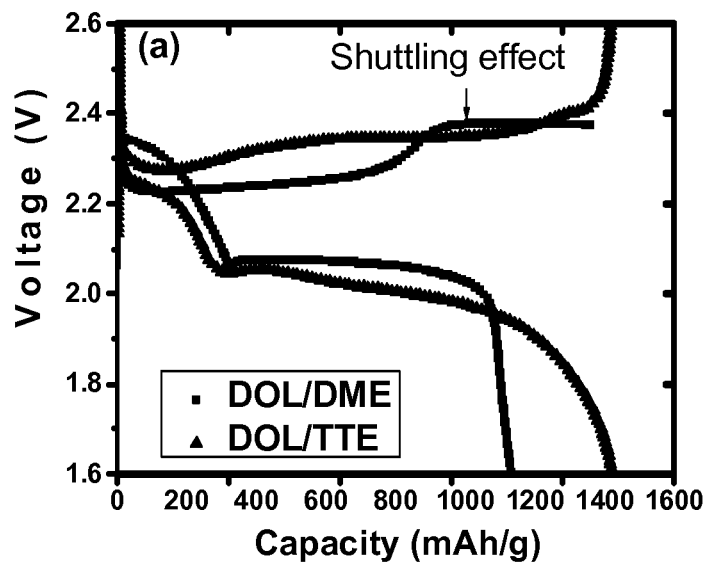
FIGS. 1A-1D are galvanostatic potential profiles of the 1$^{st}$ (A) and 30$^{th}$ (B) charge and discharge; (C) the capacity retention, and (D) the coulombic efficiency of Li—S cells with 1.0 M LiTFSI DOL/DME (5/5) and 1.0 M LiTFSI DOL/TTE (5/5) electrolyte at a 0.1 C rate, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

In one aspect, a lithium-sulfur electrochemical cell incorporating an electrolyte containing a non-polar fluorinated ether solvent is provided. Without being bound by theory, it is believe that non-polar fluorinated ether solvents, when incorporated into an electrolyte for lithium-sulfur electrochemical cells, mitigate the severe shuttling effects associated with polysulfide formation in the conventional electrolytes. In other words, in lithium-sulfur electrochemical cells with conventional electrolytes, as polysulfides form they migrate from the cathode surface through the solvent, where they can react with the solvent or lithium anode. However, in the presence of non-polar fluorinated ether solvents, the polysulfides are trapped at the cathode and they do not, or only minimally, migrate away. Accordingly, capacity and cycling is maintained. As used herein, electrochemical cells include, but are not limited to, batteries and capacitors.

The electrolytes above include the non-polar fluorinated ether solvent and a salt. The non-polar fluorinated ether solvents include both monomeric and polymeric materials. The non-polar fluorinated ether solvents inhibit shuttling in the lithium-sulfur batteries, while improving capacity retention and coulombic efficiency, and eliminating, or at least minimizing, self-discharge, which is another common problem with lithium-sulfur batteries. Without being bound by theory, it is believed that the non-polar fluorinated ether not only suppresses the dissolution of the polysulfides and prevents the parasitic reaction of polysulfide with solvent and the lithium anode, but also forms a passivation layer or solid electrolyte interphase (SEI) on the surface of the sulfur cathode and the lithium anode. The non-polar fluorinated ether solvents also have a protective effect, eliminating crystal-like lithium sulfide discharge deposits, and instead maintaining a morphology similar to the pristine cathode. The Li—S battery with non-polar fluorinated ether exhibits a high active material utilization, long cycle life, and a diminished or no self-discharge.

Generally, the non-polar fluorinated ether solvent include those represented as R—O—$R^1$, where R is a partially fluorinated, or perfluorinated alkyl group, and $R^1$ is a partially fluorinated, or perfluorinated alkyl group, R and $R^1$ optionally being interrupted by additional oxygen atoms, as in a partially or perfluorinated ether group. Alternatively, R and $R^1$ may be linked together to form a cyclic fluorinated ether. For example, either or both of R and $R^1$ may be a partially fluorinated or perfluorinated polyethyleneglycol, polypropyleneglycol, or polybutyleneglycol residue. Cyclic fluorinated ether may have the following formula:

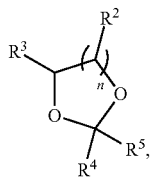

where each of $R^2$, $R^3$, $R^4$, and $R^5$ is a partially fluorinated or perfluorinated group, and n is from 1 to 3. Illustrative non-polar fluorinated ether solvents include, but are not limited to 1,1,2,2-tetrafluoroethyl-2,2,3,3-tetrafluoropropyl ether (TTE); 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; difluoromethyl-2,2,3,3-tetrafluoropropyl ether; 2-fluoro-1,3-dioxolane; 2,2-difluoro-1,3-dioxolane; 2-trifluoromethyl-1,3-dioxolane; 2,2-bis(trifluoromethyl)-1,3-dioxolane; 4-fluoro-1,3-dioxolane; or 4,5-difluoro-1,3-dioxolane. A mixture of any two or more such non-polar fluorinated ether solvents may also be used. In some embodiments, the non-polar fluorinated solvent is TTE.

In addition to the non-polar fluorinated solvent, in any of the embodiments, the electrolyte may also include a non-fluorinated co-solvent. Such co-solvents should support the electrolyte function, and not be deleterious to the battery or other electrochemical cells. Illustrative non-fluorinated co-solvents include, but are not limited to, 1,3-dioxolane (DOL); dimethoxyethane (DME), di(ethylene glycol) dimethyl ether, tri(ethylene glycol) dimethyl ether, tetra(elene glycol) dimethyl ether (TEGDME), oligo(ethylene glycol)-substituted siloxanes, oligo(ethylene glycol)-substituted silanes, and ionic liquids. In some embodiments, the non-fluorinated solvent is DOL.

In the electrochemical cells where both the non-polar fluorinated ether solvent and a non-fluorinated solvent are present, a volume ratio of the two (or mixtures of either thereof) may be optimized to support battery function. For example, the ratio may range from about 1:9 to about 9:1. In any of the above embodiments, the volume ratio may be from about 3:7 to about 7:3. In yet other embodiments, the volume ratio may be about 1:1.

The salt of the electrolyte may be a metal, ammonium, or tetraalkylammonium salt. In some embodiments, the salt is a lithium salt. Illustrative salts include, but are not limited to, $LiPF_6$, $LiClO_4$, $Li(CF_3SO_2)_2N$ (LiTFSI), $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n'}H_{n'}$, where X is a halogen, n is an integer from 0 to 12, and n' is an integer from 0 to 10, $LiAlF_4$, $LiBF_4$, $Li(FSO_2)_2N$, $Li_2SO_4$, and $LiAsF_6$. The salt may be present in the electrolyte at a concentration from about 0.1M to about 3.0 M. In some embodiments, the salt is present in the electrolyte at a concentration of about 1 M.

The electrolytes may also contain an additive that further enhances the formation of a solid electrolyte interface (SEI). For example, such an additive may be $LiNO_3$, $P_2S_5$, $Li(BF_2(C_2O_4))$ ("LiBFOB"), and LiI. The additive may be present in the electrolyte at a concentration of from about 0.1M to about 0.4M. In some embodiments, the $LiNO_3$ or LiBFOB is present in the electrolyte at a concentration of about 0.1 M. In some embodiments, the LiBFOB is present in the electrolyte at a concentration of about 0.2M.

As noted above, the cathodes of the electrochemical cell include sulfur as an active material. However, sulfur is an insulator, and accordingly large amounts of conductive additives, such as carbon, are needed to assure reasonable utilization of the active material. However, sulfur content of at least 70% is required to retain the advantage of sulfur's high energy density. The sulfur content of the cathode may be from about 70 wt % to about 95 wt %. In one embodiment, the sulfur content of the cathode may be about 70 wt %. Illustrative conductive materials include, but are not limited to, synthetic graphite, carbon-coated natural graphite, hard carbon, soft carbon, and/or mesocarbon microbeads.

Conventional binders such as PVdF (polyvinylidene difluoride) are known to swell and cannot retain the porous structure of the cathode in the cycling process. In this case 10% PVDF binder is used.

In another aspect, a cathode for a lithium-sulfur battery is provided. The cathode includes a sulfur impregnated polytetrafluoroethylene-coated carbon paper. Such cathodes "trap" polysulfides that are formed on the cathode during cycling. The fibrous carbon permits effective mass transport of lithium ions while the polytetrafluoroethylene (i.e. "Teflon®"), a hydrophobic material, on the surface of the paper is in contact with the electrolyte, acting as a "force field" blocking (hydrophilic) polysulfide migration out of the paper. Such cathodes minimize sulfur losses from the cathode as a result of electrochemical cycling.

Conventional sulfur cathodes utilize a sulfur-carbon composite as active material. Sulfur is an insulator, and accordingly large amounts of conductive additives, such as carbon, arc needed to assure reasonable utilization of the active material. However, sulfur content of at least 70% is required to retain the advantage of sulfur's high energy density. The insoluble discharge products of the electrochemical reactions tend to precipitate on the cathode. As an insulating material, it results in the loss of active material. At the end of discharge, the sulfur transformed into polysulfides that may dissolve into the electrolyte, leaving voids in the cathode.

The polytetrafluoroethylene-coated carbon paper incorporates embedded sulfur particles in the carbon paper. Upon cycling, the polytetrafluoroethylene then traps lithium polysulfides within the paper on the cathode side. Thus, while blocking transport of the lithium polysulfides, the fibrous carbon in the carbon paper aids in mass and electron transfer though the electrochemical cell.

Conventional binders such as PVdF (polyvinylidene difluoride) are known to swell and cannot retain the porous structure of the cathode in the cycling process. The polytetrafluoroethylene-coated carbon fiber paper is used as an electrode matrix and the sulfur active material are embedded inside the pore structures of the paper. After the first cycle, the sulfur active materials are homogeneously coated on the surface of the carbon fibers. The carbon fibers act as an excellent substrate for mass transfer and electron transfer, which afforded good performance of lithium-sulfur battery in terms of cycle-life and coulombic efficiency.

The present invention, thus generally described, will be understood more readily by reference to the following examples, which are provided by way of illustration and are not intended to be limiting of the present invention.

EXAMPLES

Materials and Cell Testing. A sulfur-carbon nanocomposite was prepared by impregnating sulfur into a micro-sized, spherical, nanoporous carbon. The sulfur cathode included a sulfur/carbon composite (75% sulfur) with a sulfur loading of 3.9 mg/cm$^2$ to 4.2 mg/cm$^2$. The electrolyte included TTE, and DOL, LiTFSI, and LiNO$_3$. Cell cycling tests and cyclic voltammetry were conducted using 2032 coin cells. All cells were cycled with C/10 current on a Maccor series 4000 cycler within a voltage range of 1.6V to 2.6V at room temperature.

As an illustrative, but not limiting example, the sulfur cathode may be prepared by ball milling, or other milling processes in a slurry. The slurry may include approximately 60 wt % sulfur (99.95%, Aldrich), 30 wt % super P carbon, 10 wt % polyvinylidene fluoride (PVDF) as the binder and N-methyl-2-pyrrolidone (NMP) as the solvent. The slurry is coated on an aluminum current collector or carbon paper, and then placed in a 75° C. oven overnight. The cathode discs (14 mm in diameter) were further dried at 60° C. for 4 hours under vacuum in the glove-box. The electrode had an average sulfur loading of 1.5-2 mg/cm$^2$.

As used in the examples, "the fluorinated electrolyte" refers to an electrolyte of a 1:1 mixture of DOL:TTE with 1.0 M LiTFSI. As used in the examples, "the baseline electrolyte" refers to an electrolyte of a 1:1 mixture of DOL:DME with 1.0 M LiTFSI.

As used herein, DOL is an abbreviation for 1,3-dioxolane. As used herein, DME is an abbreviation for dimethoxyethane. As used herein, LiTFSI is an abbreviation for lithium bis(trifluoromethanesulfonyl)imide. As used herein, TTE is an abbreviation for 1,1,2,2-tetrafluoroethyl-2,2,3,3-tetrafluoropropyl ether.

Example 1 (Inhibition of Self-discharge)

The Li—S cells were cycled with a C/10 rate for five cycles at room temperature. At the fifth charged stage, the cells were placed on rest for 10 hours at room temperature or 55° C. The capacity of the sixth cycle discharge at room temperature was compared with that of the fifth cycle to obtain the self-discharge data.

FIG. 1A shows the initial voltage profiles of a lithium-sulfur cell with the fluorinated electrolyte. The profiles show two plateaus during discharge. The higher voltage plateau (2.2V to 2.4V) is assigned to the reduction of elemental sulfur to lithium polysulfides (Li$_2$S$_x$, where x is from 4 to 8, inclusive). The lower voltage plateau (2.1V to 2.0V) is assigned to the reduction of the polysulfides to lower order species (LiS$_2$ and/or Li$_2$S). Compared with lithium-sulfur cells having the baseline electrolyte, the fluorinated electrolyte cells showed slightly lower voltage, but much higher capacity in the first discharge. This is believed to be due to the low viscosity and low conductivity of the fluorinated electrolyte. A significant difference was observed for both cells during the subsequent charge.

Figure 1B:
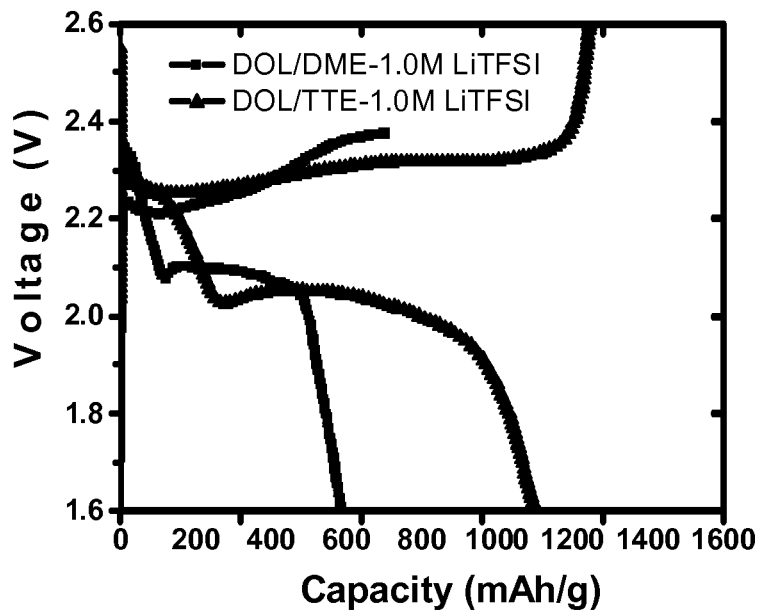
Figure 1C:
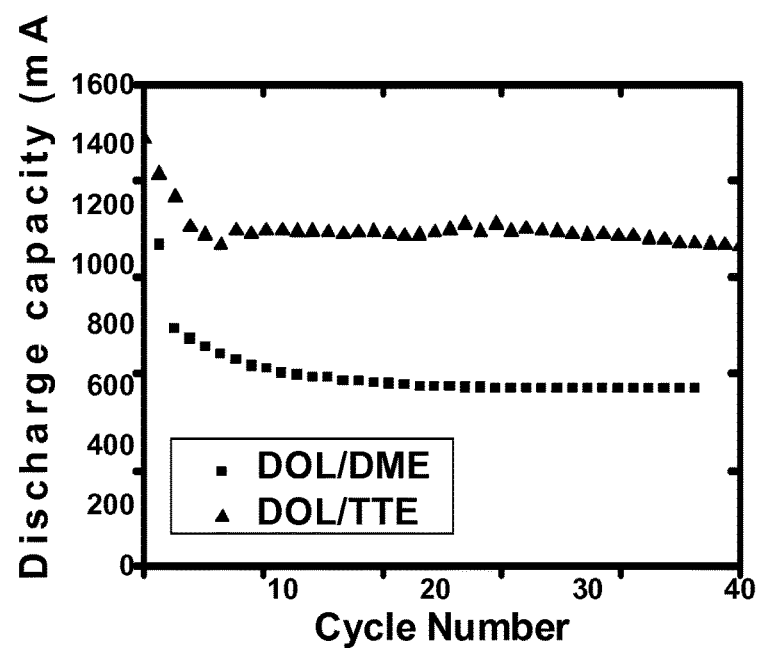
Figure 1D:
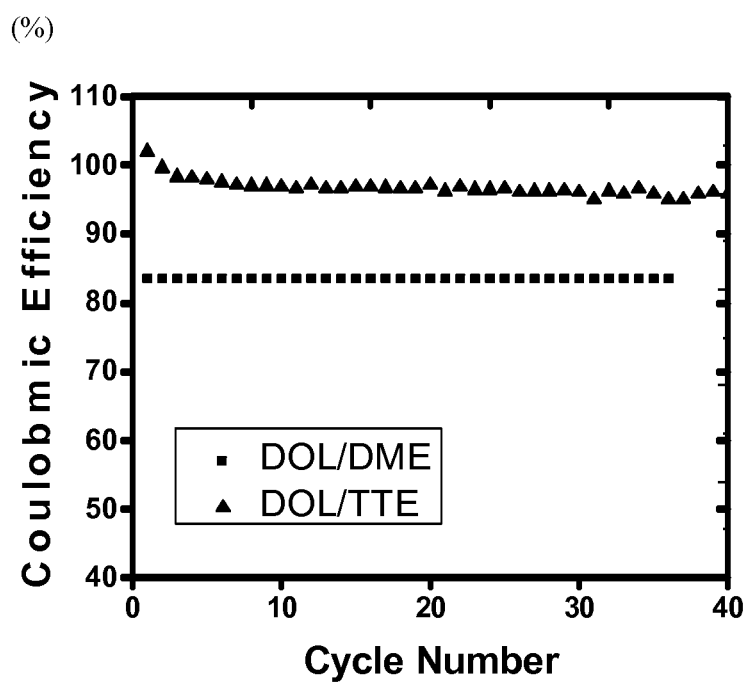

The fluorinated electrolyte cell displayed a long and flat plateau, and then a drastic voltage rise at the end of the first charging step without any redox shuttling behavior being observed. The voltage profiles remain unchanged even at deep cycling (see FIG. 1B). Due in part to its low polarity, the TTE does not readily dissolve the polysulfides, as confirmed by separate observations that indicate that Li$_2$S$_9$ failed to dissolve in TTE to any extent at room temperature. After several formation cycles, the TTE cell maintains a stable discharge capacity of 1100 mAh/g (based on the mass of the sulfur in the cathode) for 50 cycles with a CE of 98% (FIG. 1D). This result illustrates the effective inhibition of the polysulfide shuttling effect in the fluorinated electrolyte.

In contrast, the baseline electrolyte cell does not charge completely at each cycle due to the severe shuttling of dissolved polysulfides. The capacity retention and the coulombic efficiency (CE) of lithium-sulfur cells with two electrolytes are presented in FIGS. 1C and 1D. Low initial capacity and rapid capacity fading with low CE are observed for the lithium-sulfur cell using baseline electrolyte due to the dissolution of lithium polysulfide intermediates into the electrolyte, which leads to active sulfur loss and redox shuttle reactions.

Example 2 (Cyclic Voltammetry)

Figure 2A:
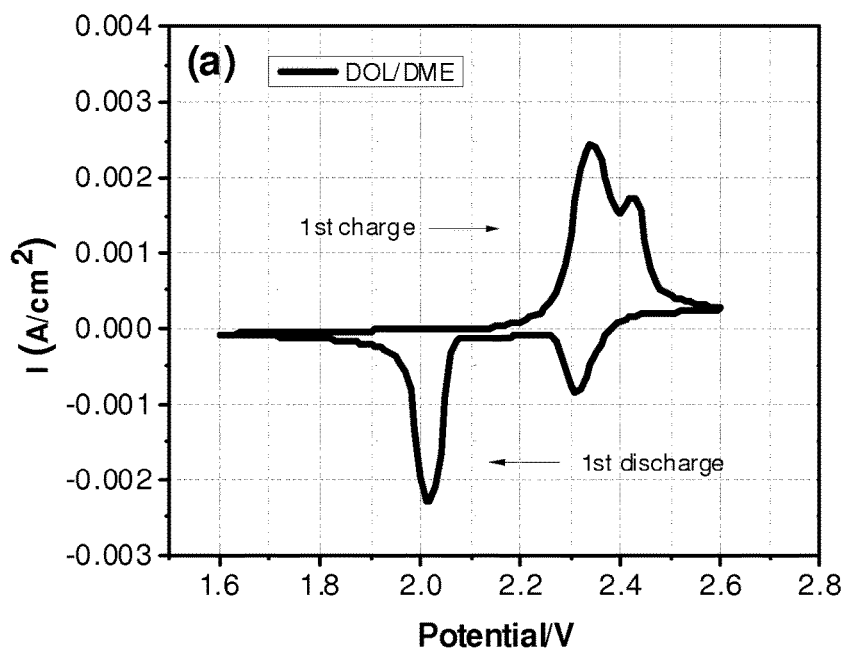
FIGS. 2A-F show cyclic voltammograms of the 1$^{st}$ cycle for a Li—S cell with (A) 1.0 M LiTFSI DOL/DME and (B) 1.0 M LiTFSI-DOL/TTE electrolyte (at a scanning rate of 27 µV/s); differential capacity dQ/dV profiles of (C) the 1$^{st}$ discharge, (D) the 10$^{th}$ discharge, (E) the 30$^{th}$ discharge and (F) the 50$^{th}$ discharge for a Li—S cell with 1.0 M LiTFSI-DOL/TTE electrolyte, according to the examples.
Figure 2B:
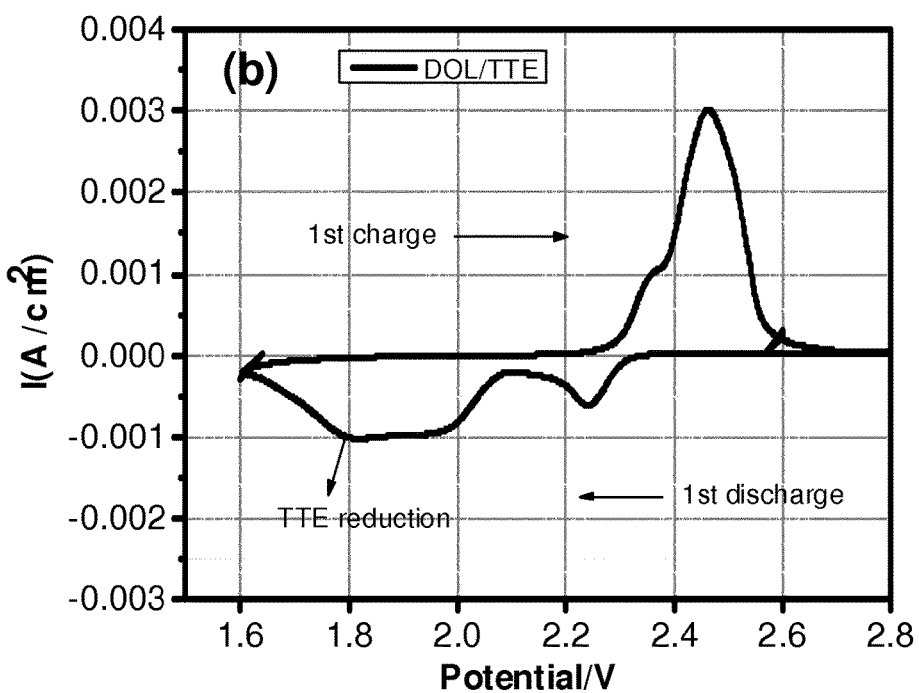
Figure 2C:
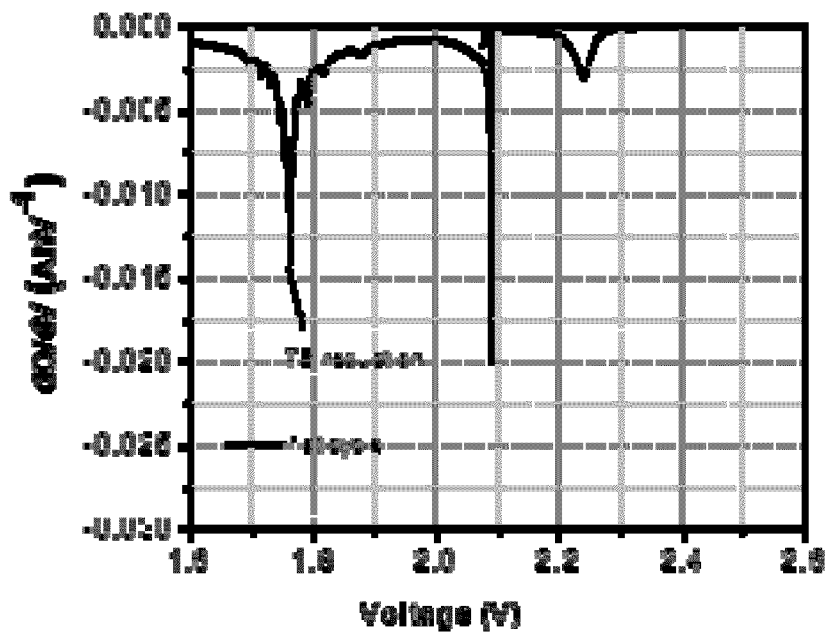
Figure 2D:
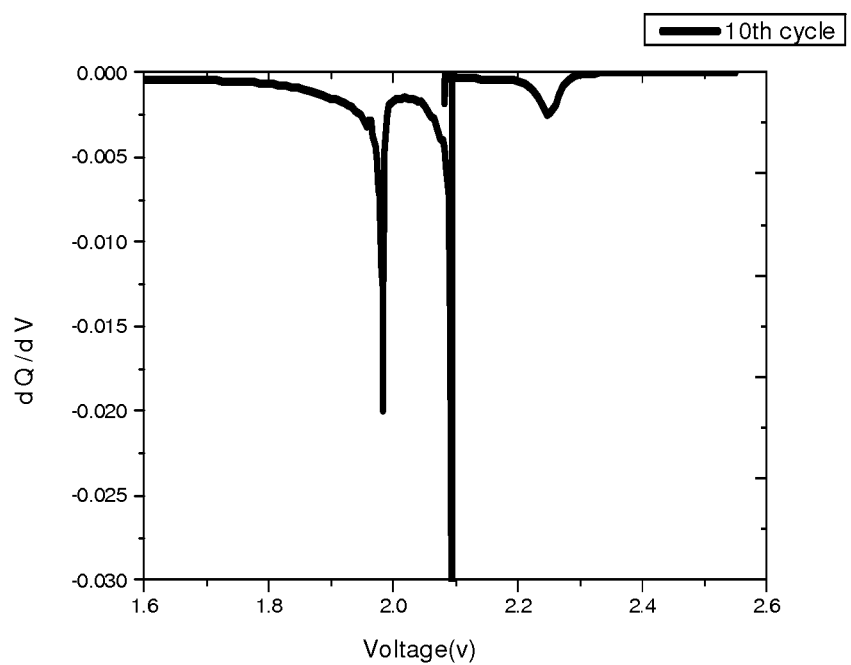
Figure 2E:
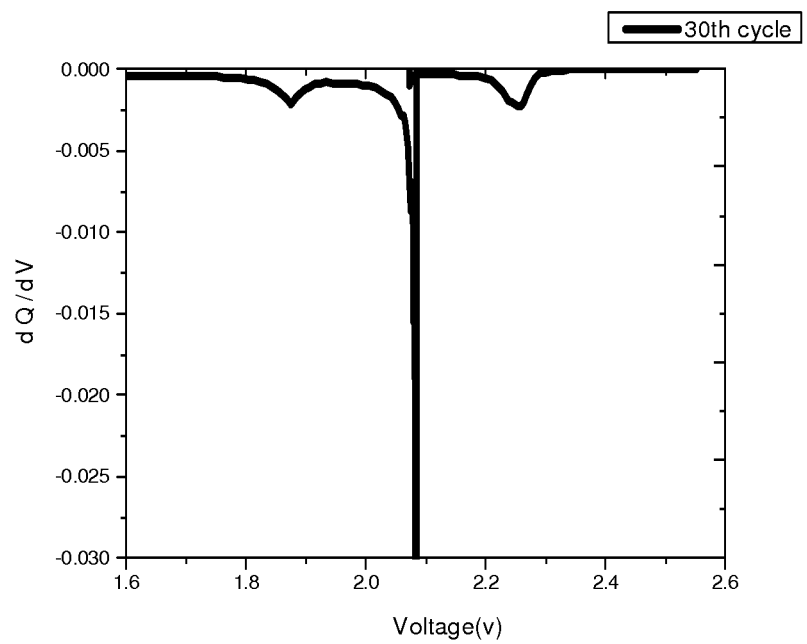
Figure 2F:
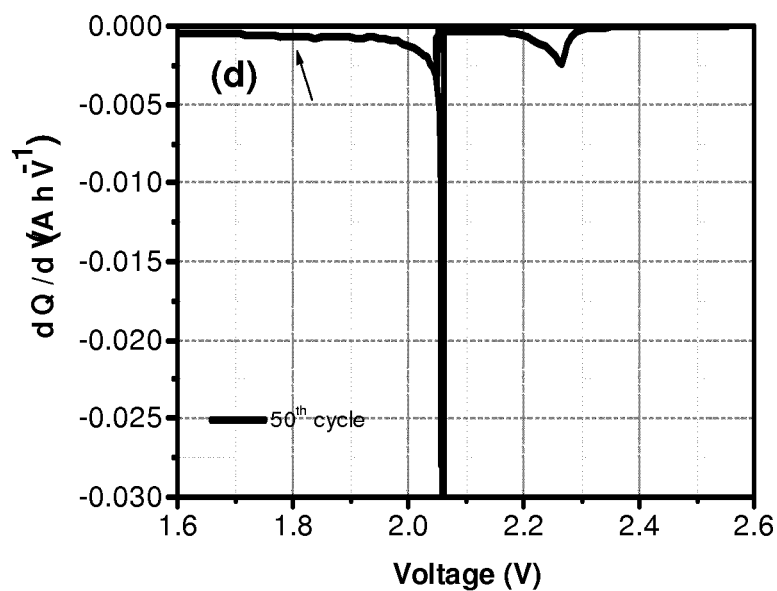

To investigate the mechanism of the non-shuttling effect of the fluorinated electrolyte, cyclic voltammetry measurements were conducted on the two cells. For the baseline cell, two major cathodic peaks appeared at 2.35 V and 2.0 V in the first cathodic scan, corresponding to the reduction of elemental sulfur and the intermediate polysulfides (FIG. 2A). For the fluorinated electrolyte, in addition to cathodic peaks at 2.24 V and 1.9V (FIG. 2B), a third reduction peak appears at 1.8V, corresponding to the gradual slope at the end of the first discharge process as illustrated in FIG. 1A. This was further confirmed by the 1st cycle dQ/dV profile as shown in FIG. 2C. The intensity of this peak gradually decreases and eventually disappears upon cycling, as evidenced by the series of FIGS. 2D (10$^{th}$ cycle), 2E (30$^{th}$ cycle), and 2F (50$^{th}$ cycle). This behavior is associated with the reductive decomposition of the fluorinated TTE solvent on the surface of the sulfur/carbon particles during the discharge, forming a passivation layer as the so-called solid-electrolyte interphase (SEI).

Another noticeable difference for the TTE electrolyte cell is the significant decrease in the redox current for the second reduction peak. This finding indicates the slow kinetics of polysulfides to the discharge product Li$_2$S and/or Li$_2$S$_2$, thereby preventing the loss of active material. Interestingly, the first charge for the TTE electrolyte cell showed one major anodic peak (2.45V), accounting for the oxidation reaction of high order polysulfides. The small shoulder peak (2.35 V) is associated with the transition of low-concentration $Li_2S_2$ and/or $Li_2S$ to higher order polysulfides. This finding suggests that the oxidation reaction of the higher order polysulfides dominates the charging process for the fluorinated electrolyte cell. As discussed above, the higher order polysulfides are not fully reduced to insoluble low order polysulfides during the discharge, and, thus, they can be converted to sulfur with fast kinetics during charging. Theoretically, a specific capacity of 1675 mAh/g can be achieved from S to $Li_2S$ and 837.5 mAh/g from S to $Li_2S_2$, a stable capacity of 1100 mAh/g for the fluorinated electrolyte Li—S cell indicates the discharged product in this cell could be a mixture of $Li_2S$ and $Li_2S_2$.

Fluorinated compounds, typically, are thermodynamically unstable in contact with lithium metal and the two tend to react, chemically. As a perfluorinated ether, TTE, and other non-polar fluorinated ethers, react with lithium at the surface of the anode and form, de-fluorinated, unsaturated ethers, and LiF. The unsaturated ether than forms a composite layer with the LiF on the lithium anode surface. The composite layer acts as a physical barrier on the anode, thereby inhibiting further chemical and electrochemical reaction of polysulfides with the Li anode.

Example 3 (Morphology)

Figure 3A:
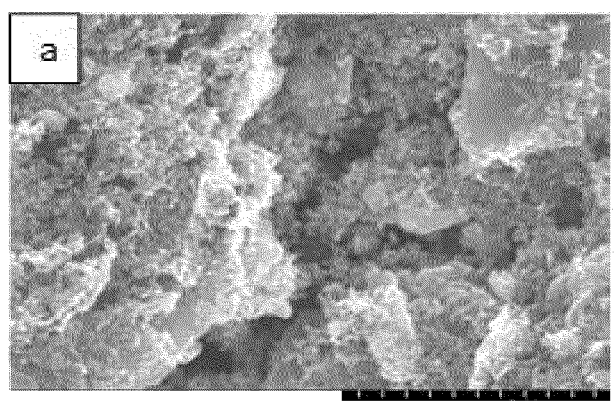
FIGS. 3A-E shows SEM images of (A) pristine sulfur electrode, (B) discharged sulfur electrode using 1.0 M LiTFSI DOL/DME, and (C) discharged sulfur electrode using 1.0 M LiTFSI DOL/TTE; EDS spectra of sulfur electrode at the first discharge using (D) 1.0 M LiTFSI DOL/DME and (E) 1.0 M LiTFSI DOL/TTE electrolytes, according to the examples. For images in FIGS. 3A, 3B, and 3C, the scale in the lower right corner is 5.00 µm.
Figure 3B:
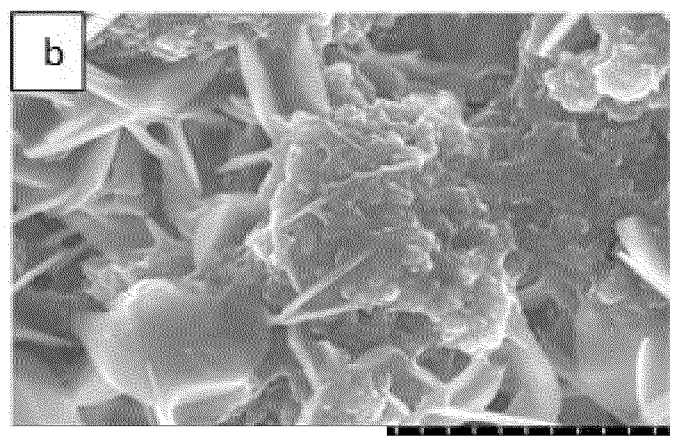
Figure 3C:
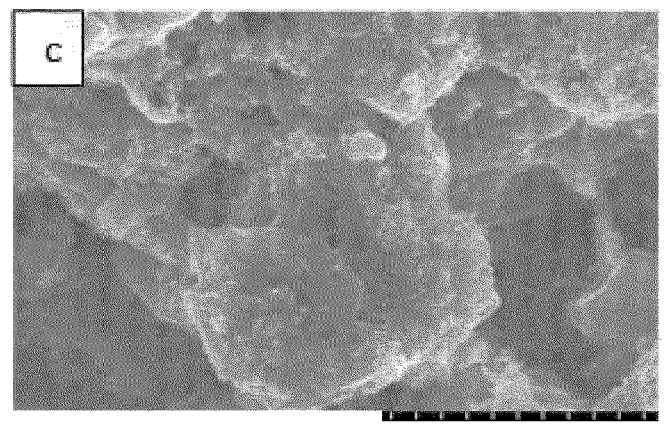
Figure 3D:
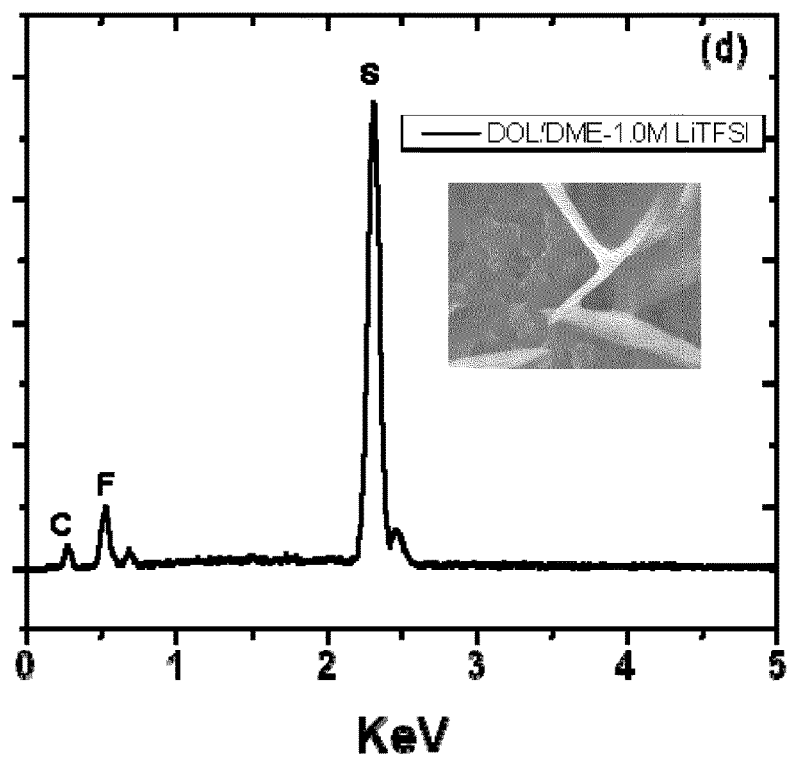
Figure 3E:
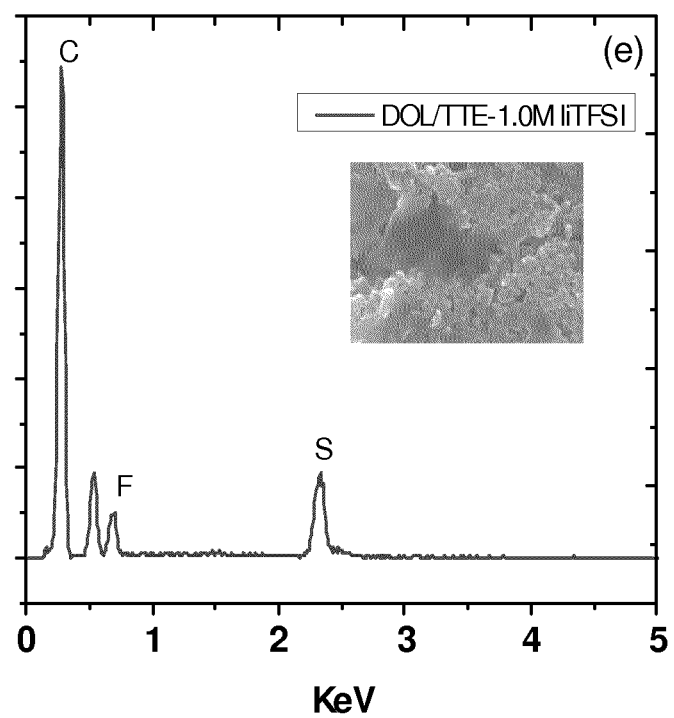

A Hitachi S-4700-II scanning electron microscope with a field emission electron source was used for electrode morphology study. The morphological changes of the sulfur electrode discharged in the fluorinated electrolyte and in the baseline electrolyte we observed. FIG. 3A is a typical SEM (scanning electron microscope) image of a pristine sulfur/carbon electrode. After the first discharge in the baseline electrolyte, the surface of cathode had been deposited with large quantities of crystal-like discharge products of insoluble lithium sulfides (e.g. $Li_2S$ and $Li_2S_2$), as shown in FIG. 3B. Further analysis of the deposit by energy-dispersive X-ray spectroscopy (EDS) revealed a sulfur-rich agglomeration, as shown in FIG. 3D. In contrast, in the presence of the fluorinated electrolyte, the discharged electrode showed morphology similar to the pristine cathode, filled with fine discharged product particles/flakes in the porous structure of the sulfur-carbon composite, as illustrated in FIG. 3C. Additionally, much less lithium polysulfide deposition was detected in the EDS spectrum (FIG. 3E).

The above results indicate that an SEI layer forms on the cathode surface through reductive decomposition. The SEI suppresses polysulfide dissolution and agglomeration of the discharged species. It is believed that this conclusion is supported by the improved specific capacity and superior CE for the fluorinated electrolyte versus the baseline electrolyte containing cell.

Figure 4A:
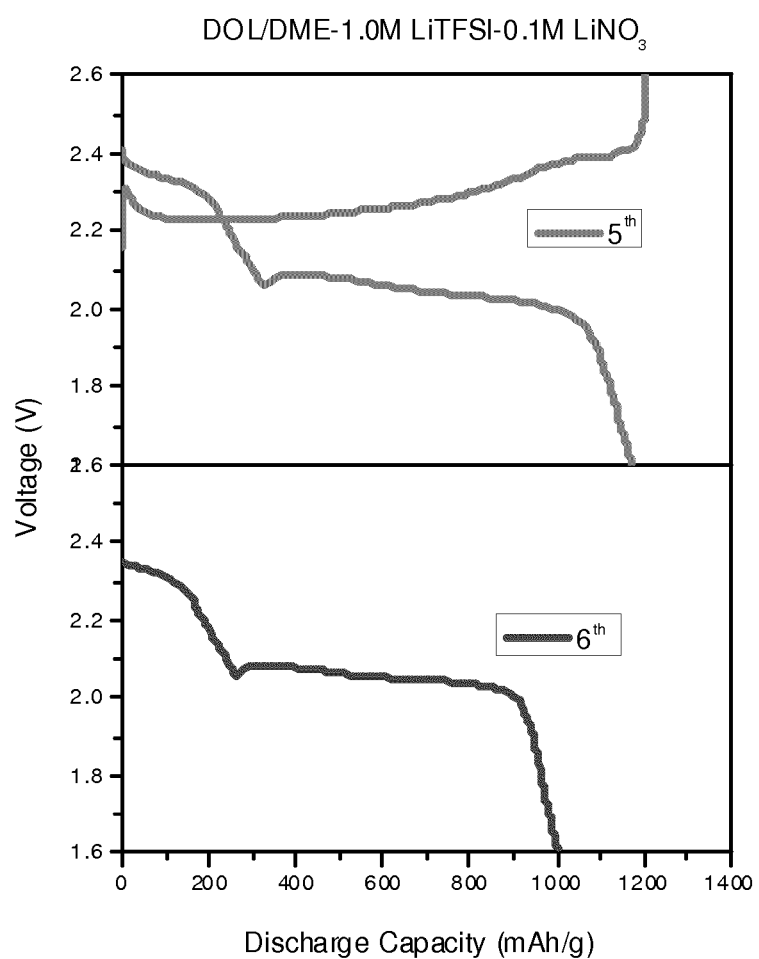
FIG. 4A shows the self-discharge curves for a lithium-sulfur cell with the baseline electrolyte haying an 8% decrease.
Figure 4B:
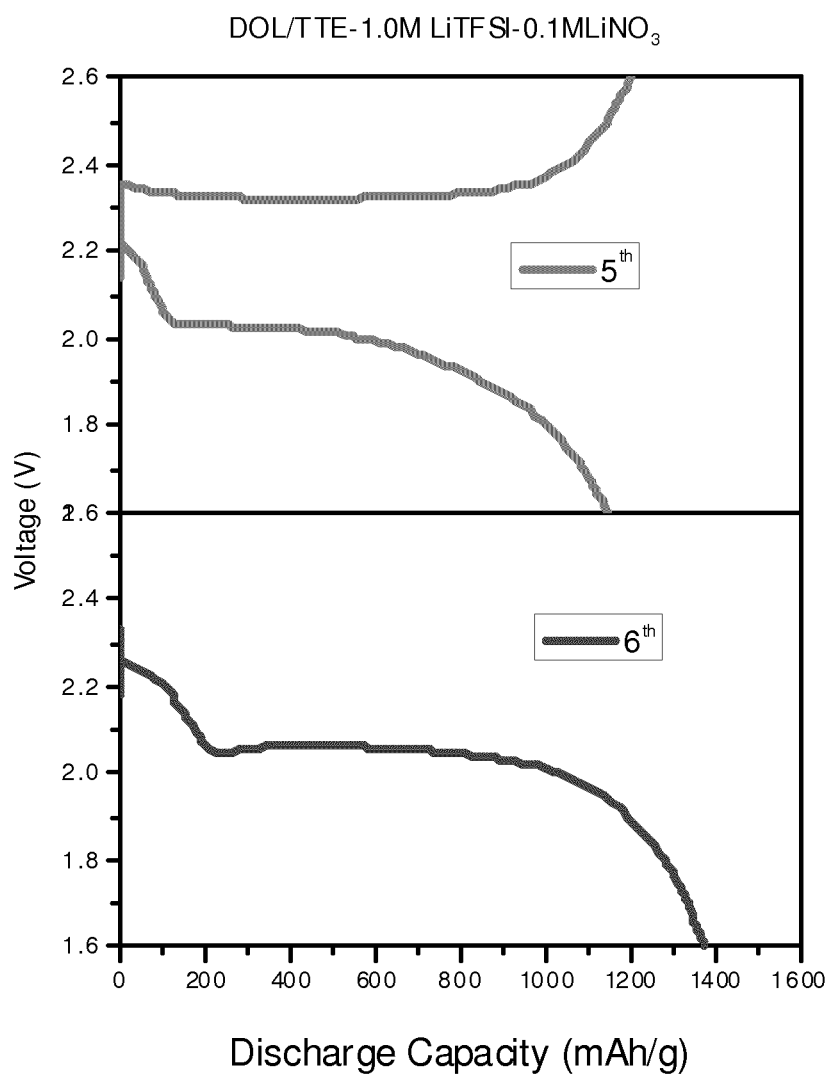
FIG. 4B shows the self-discharge curves for a lithium-sulfur cell with the fluorinated electrolyte having an 20% increase, according to the examples.

When the fluorinated electrolyte contains approximately 0.1 M $LiNO_3$, the electrolyte is found to suppress self-discharge of the lithium-sulfur cell. The self-discharge is known to be caused by the reaction of the lithium metal anode with the dissolved polysulfide in the electrolyte. Test results show that addition of 0.1 M $LiNO_3$ to the fluorinated electrolyte showed a 20% improvement in self-discharge resistance after cycling at 55° C. (see FIG. 4A). The cycling conditions are listed in Table 1. Further, the lithium-sulfur battery with the fluorinated electrolyte and $LiNO_3$ shows an increase in discharge capacity when cycling at 55° C. compared to room temperature cycling (see FIG. 4B).

TABLE 1

Cycling conditions for self-discharge.

| Step | Condition |
| --- | --- |
| 1 Rest | 2 hours |
| 2 Discharge | C/10 |
| 3 Rest | 10 minutes |
| 4 Charge | C/10 |
| 5 Rest | 10 minutes |
| 6 Cycle | Steps 2-5 (5 cycles) |
| 7 Rest | 10 hours |
| 8 Discharge | C/10 |

Figure 5:
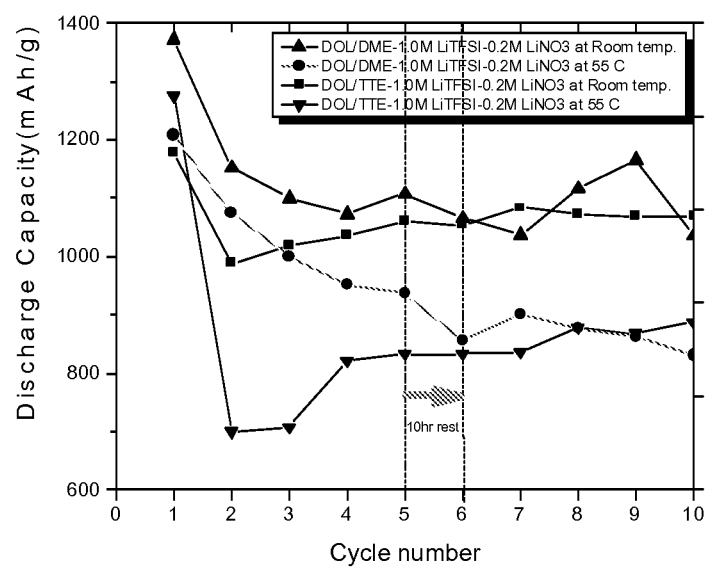
FIG. 5 shows the self-discharge curves for a lithium-sulfur cell with the fluorinated electrolyte and the baseline electrolyte, at room temperature and at 55° C., according to the examples.
Figure 6A:
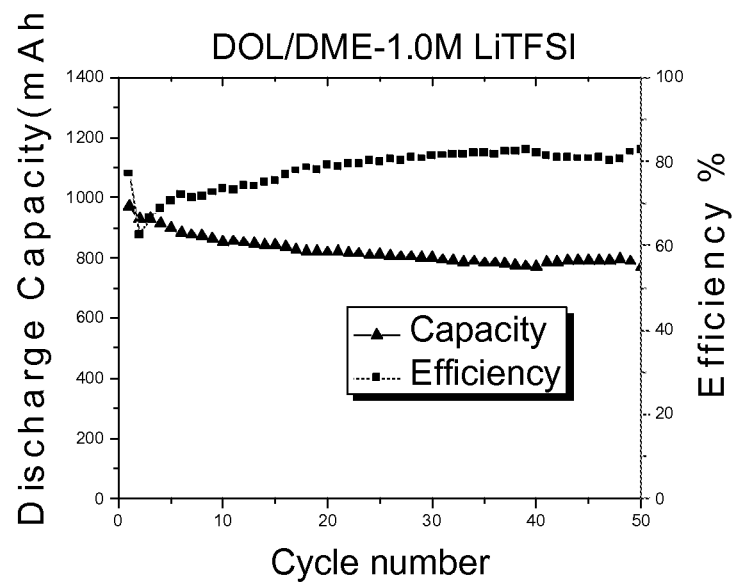
FIG. 6A is a dual graph of efficiency (right axis) and discharge capacity (left axis) versus cycling for 60 wt % sulfur coated on polytetrafluoroethylene-coated carbon paper in the presence of a baseline electrolyte.
Figure 6B:
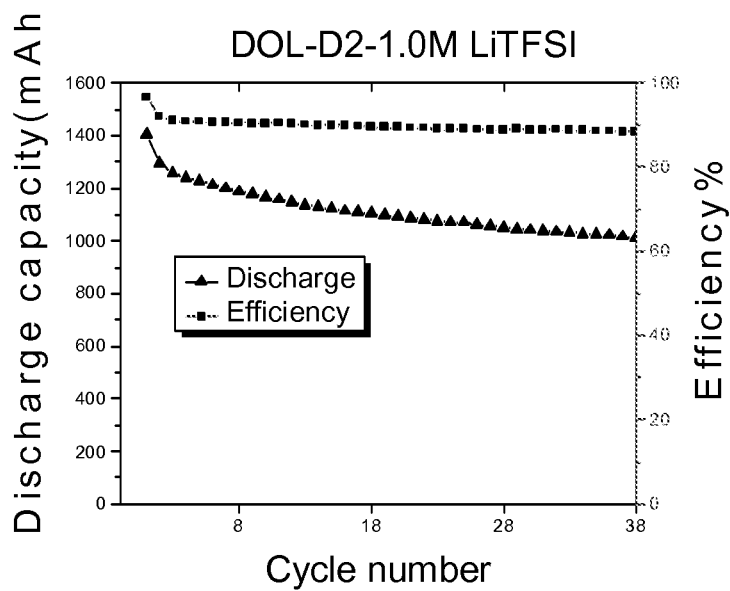
FIG. 6B is a dual graph of efficiency (right axis) and discharge capacity (left axis) versus cycling for a cell cycled with combined effect of fluorinated electrolyte and sulfur coated on TEFLON coated carbon paper, according to the examples.
Figure 7A:
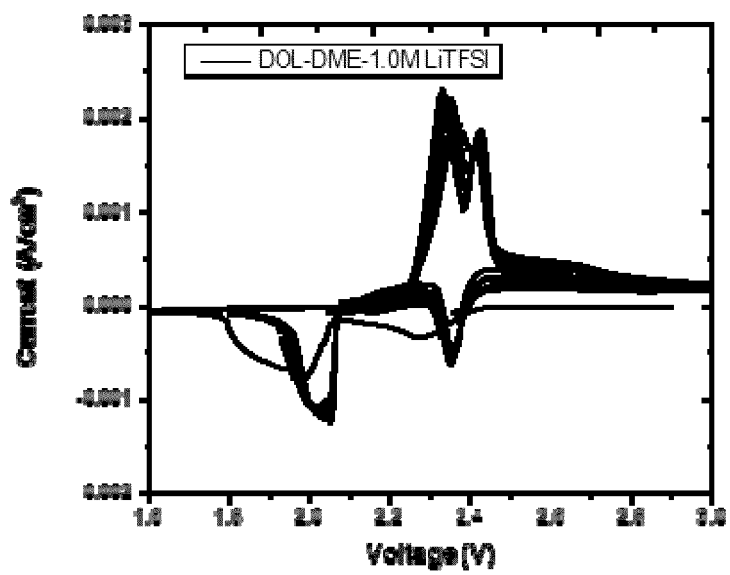
FIGS. 7A and 7B show cyclic voltammograms of the first 10 cycles at scan rate of 0.03 mV/s for polytetrafluoroethylene-coated carbon paper in a baseline electrolyte and in a fluorinated electrolyte according to the examples.
Figure 7B:
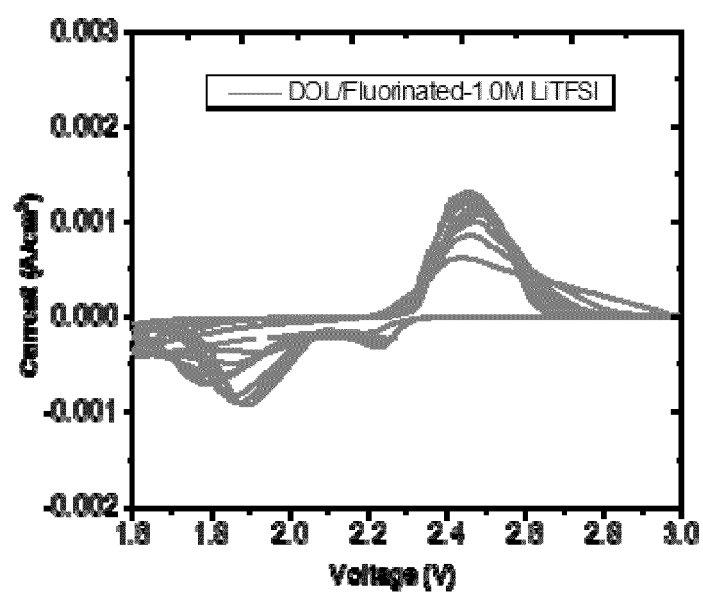
Figure 8:
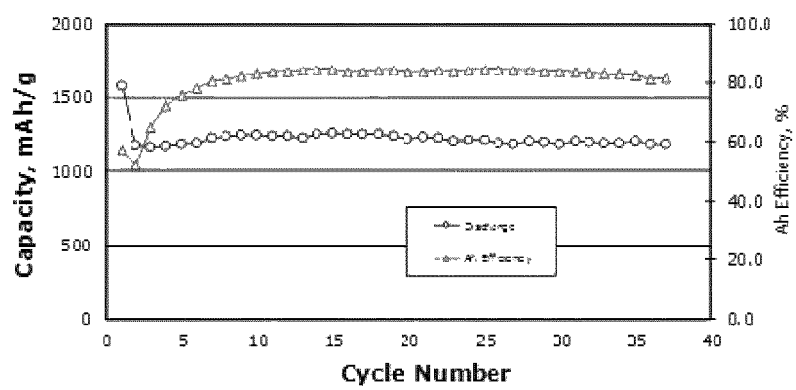
FIG. 8 is a dual graph of efficiency (right axis) and discharge capacity (left axis) versus cycling for a 60 wt % sulfur, 30 wt % Super P carbon, 10 wt % PVDF binder coated on Teflon-coated carbon paper with a 1.0 M LiTFSI DOL/TTE 5/5 electrolyte at a loading of 3.06 mg/cm$^2$, according to the examples.
Figure 9:
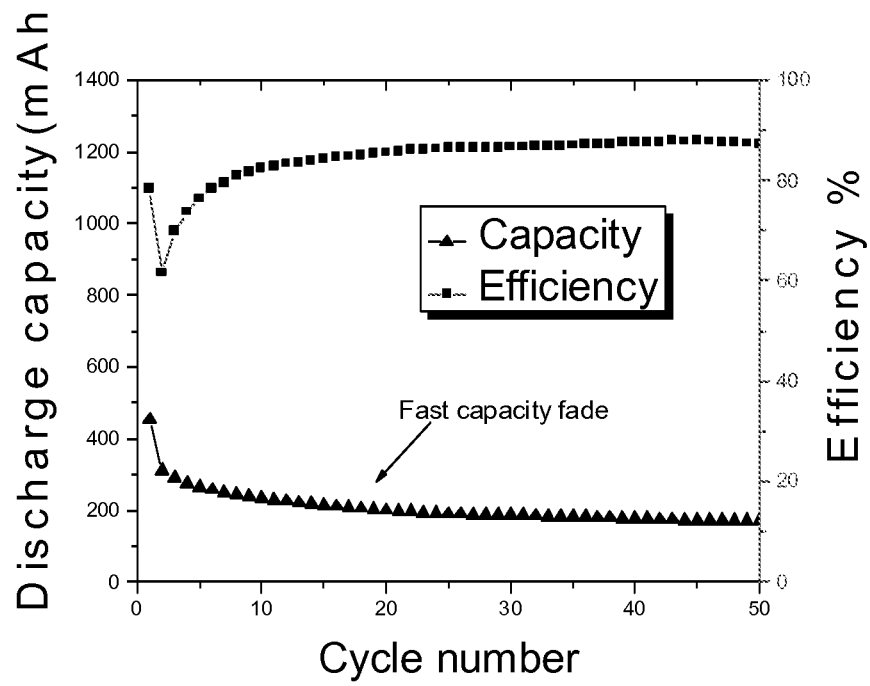
FIG. 9 is a dual graph of efficiency (right axis) and discharge capacity (left axis) versus cycling for a 60 wt % sulfur, 30 wt % Super P carbon, 10 wt % PVDF binder coated on Al current collector with a 1.0 M LiTFSI DOL/DME 5/5 electrolyte at a loading of 3.06 mg/cm$^2$, according to the examples.

In contrast, a lithium-sulfur cell prepared with the baseline electrolyte with $LiNO_3$ lost about 8% discharge capacity after a 10 hour rest in the charged state at room temperature, and the loss increased significantly at elevated temperature (55° C.) under the conditions listed in Table 1. See the results in FIG. 5. Without being bound by theory, it is believed that the improvement in self-discharge performance is associated with the surface layers formed with fluorinated solvent on the sulfur cathode and Li anode, respectively. With the former suppressing the dissolution of high-order polysulfides into the electrolyte and the latter preventing the dissolved polysulfides from reacting with the Li anode.

Example 4

Cell having a Teflon®-coated carbon paper cathode. Teflon®-coated carbon composite paper (Toray Paper 120—TGP-H-120), is impregnated with sulfur. The paper had a thickness of approximately 370 microns.

The sulfur slurry containing 60 wt % sulfur (99.95%, Aldrich), 30 wt % super P carbon, 10 wt % polyvinylidene fluoride (PVDF) as the binder and N-methyl-2-pyrrolidone (NMP) as the solvent was coated on one sided Teflon coated carbon paper. The sulfur is coated on the side with out any Teflon coating, and the carbon paper side with the Teflon coating is facing the separator.

It is believed that using the Teflon-coated carbon paper as current collector on the surface of the paper which is in contact with the electrolyte performs as a shield blocking the migration of polysulfides out of the cathode due to the hydrophobic property of this material. Therefore, the capacity retention and cycling efficiency have improved due to the less loss of the active material and less shuttling effect. Teflon binders are used to bind the sulfur particles to the current collector, which will not provide the physical barrier for the polysulfide dissolution. However, when the Teflon-coated carbon paper is used, the outerlayer of the Teflon has high hydrophobicity and compelling the dissolved polysulfides from crossing over to the anode side, thus improves the coloumbic efficiency and the cycling performance.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A lithium-sulfur electrochemical cell comprising:
    an anode;
    a cathode comprising a polytetrafluoroethylene-coated carbon paper and sulfur wherein the sulfur is elemental sulfur embedded in the polytetrafluoroethylene-coated carbon paper; and
    an electrolyte consisting essentially of a salt, a non-polar fluorinated ether solvent, and optionally a non-fluorinated co-solvent selected from the group consisting of 1,3-dioxolane (DOL); dimethoxyethane (DME), di(ethylene glycol) dimethyl ether, tri(ethylene glycol) dimethyl ether, tetra(ethylene glycol) dimethyl ether (TEGDME), oligo(ethylene glycol)-substituted siloxanes, oligo(ethylene glycol)-substituted silanes, or ionic liquids.

2. The lithium-sulfur electrochemical cell of claim 1, wherein the non-polar fluorinated ether solvent is of formula R—O—$R^1$, wherein R is a partially fluorinated, or perfluorinated alkyl group, and $R^1$ is a partially fluorinated, or perfluorinated alkyl group, R and $R^1$ optionally being interrupted by oxygen atoms, and R and $R^1$ may join to form a cyclic fluorinated ether.

3. The lithium-sulfur electrochemical cell of claim 1, wherein the non-polar fluorinated ether solvent comprises 1,1,2,2-tetrafluoroethyl-2,2,3,3-tetrafluoropropyl ether (TTE); 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; or difluoromethyl-2,2,3,3-tetrafluoropropyl ether.

4. The lithium-sulfur electrochemical cell of claim 1, wherein the non-polar fluorinated ether solvent comprises 1,1,2,2-tetrafluoroethyl-2,2,3,3-tetrafluoropropyl ether (TTE).

5. The lithium-sulfur electrochemical cell of claim 1, wherein the anode comprises elemental lithium.

6. The lithium-sulfur electrochemical cell of claim 5, wherein the non-polar fluorinated ether solvent is of formula R—O—$R^1$, wherein R is a partially fluorinated, or perfluorinated alkyl group, and $R^1$ is a partially fluorinated, or perfluorinated alkyl group, R and $R^1$ optionally being interrupted by oxygen atoms, and R and $R^1$ may join to form a cyclic fluorinated ether.

7. The lithium-sulfur electrochemical cell of claim 5, wherein the non-polar fluorinated ether solvent comprises 1,1,2,2-tetrafluoroethyl-2,2,3,3-tetrafluoropropyl ether (TTE); 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; difluoromethyl-2,2,3,3-tetrafluoropropyl ether; 2-fluoro-1,3-dioxolane; 2,2-difluoro-1,3-dioxolane; 2-trifluoromethyl-1,3-dioxolane; 2,2-bis(trifluoromethyl)-1,3-dioxolane; 4-fluoro-1,3-dioxolane; or 4,5-difluoro-1,3-dioxolane.

8. The lithium-sulfur electrochemical cell of claim 5, wherein the non-polar fluorinated ether solvent comprises 1,1,2,2-tetrafluoroethyl-2,2,3,3-tetrafluoropropyl ether (TTE).

9. The lithium-sulfur electrochemical cell of claim 1, wherein the non-fluorinated solvent comprises 1,3-dioxolane.

10. The lithium-sulfur electrochemical cell of claim 1, wherein the salt is present in the electrolyte at a concentration from about 0.1 M to about 3 M.

11. The lithium-sulfur electrochemical cell of claim 1, wherein the salt comprises a lithium salt.

12. The lithium-sulfur electrochemical cell of claim 11, wherein the lithium salt comprises $LiNO_3$, $Li[BF_2(C_2O_4)]$, $LiPF_6$, $LiClO_4$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n'}H_{n'}$, where X is a halogen, n is an integer from 0 to 12, and n' is an integer from 0 to 10, $LiAlF_4$, $LiBF_4$, $Li(FSO_2)_2N$, $Li_2SO_4$, or $LiAsF_6$.

13. The lithium-sulfur electrochemical cell of claim 12, wherein the $LiNO_3$ or $Li[BF_2(C_2O_4)]$ is present in the electrolyte at a concentration from about 0.1 M to about 0.4 M.

* * * * *